United States Patent [19]
Weichselbaum

[11] Patent Number: 5,855,481
[45] Date of Patent: Jan. 5, 1999

[54] PANAMA CANAL INTERACTIVE MODEL AND GAME

[76] Inventor: Ruth Weichselbaum, 147-40 77th Rd., Flushing, N.Y. 11367

[21] Appl. No.: 889,854

[22] Filed: Jul. 8, 1997

[51] Int. Cl.$^6$ ...................................................... G09B 9/00
[52] U.S. Cl. .............................................................. 434/126
[58] Field of Search ..................................... 434/126, 150, 434/151, 152, 300, 299, 389; 446/166

[56] References Cited

U.S. PATENT DOCUMENTS

| | | |
|---|---|---|
| 640,439 | 1/1900 | Boyton . |
| 757,286 | 4/1904 | Du Clos . |
| 1,014,975 | 1/1912 | Poehlman . |
| 2,285,737 | 6/1942 | McLeod . |
| 4,242,829 | 1/1981 | Arnstrom et al. . |

OTHER PUBLICATIONS

"Parade of Progress", The Washington Post (Newspaper), Aug. 8, 1948, p. 15.

*Primary Examiner*—Jeffrey A. Smith
*Attorney, Agent, or Firm*—Alfred M. Walker

[57] ABSTRACT

An educational amusement device imitates a canal, such as the Panama Canal. The device includes a base having a first water impermeable pan therein. An imitation terrain structure includes three dimensional forms extending upward from a top edge of the pan, and at least one further water impermeable pan therein. The first pan and the further pan are respectively connected to at least one connecting conduit lock to vary water depth between the first pan and the further pan, such as a fluid volume regulating one lock gate openable from a lowered closed position to a raised open position. The connecting conduit lock is in fluid flow communication between the first pan and the further pan. The base includes a bottom floor and a plurality of interconnected upwardly extending walls. One of the walls is a vertically extending transparent proximal wall providing a visual viewing image of respective interiors of the first pan, the further pan and the connecting conduit lock.

19 Claims, 9 Drawing Sheets

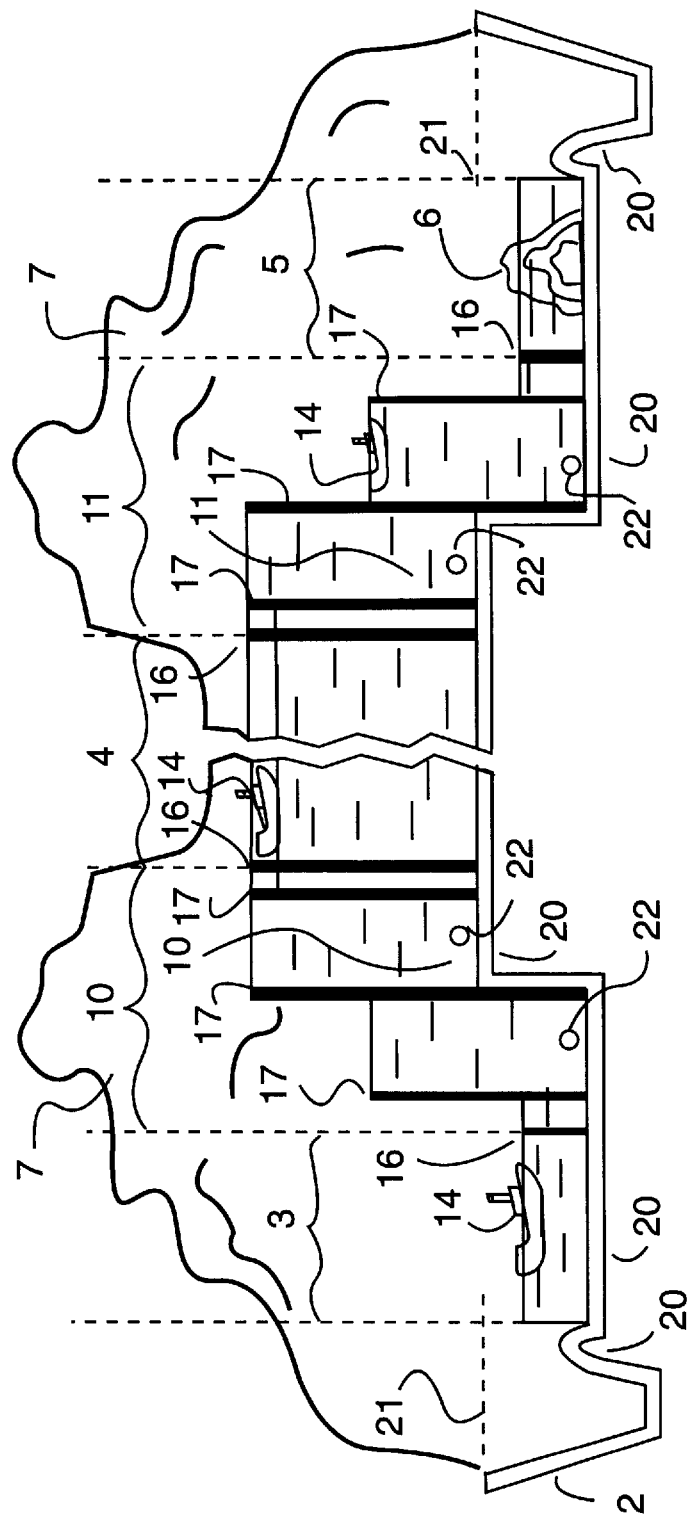

Card No. 3

"JUNGLE LEAF" COMMANDS ( example)

2. You may continue your trip

3. Return to Atlantic or Pacific

4. You may leave any lock

5. Opponent may drain water from any lock

6. Stuck on shore....wait 10 seconds

7. Jump to final destination.... Instant win

8. You may continue your trip.

9. Go or return to first lock

10. You may continue your trip.

11. Enter/reenter Gatun Lake..... go around keys

12. Stuck on shore.... wait 10 seconds

*Fig. 6*

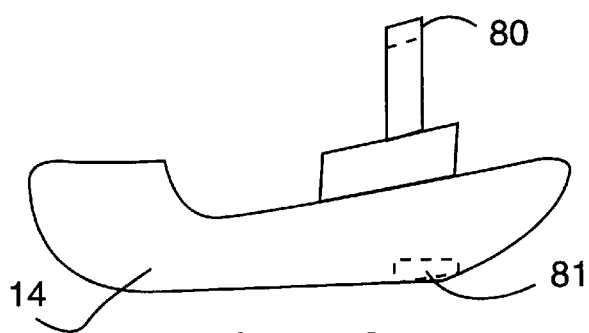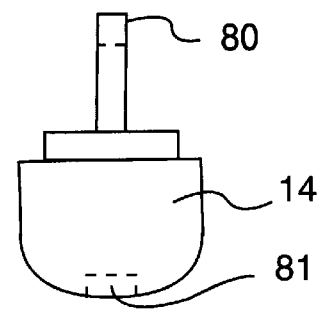
Fig. 9A    Fig. 9B
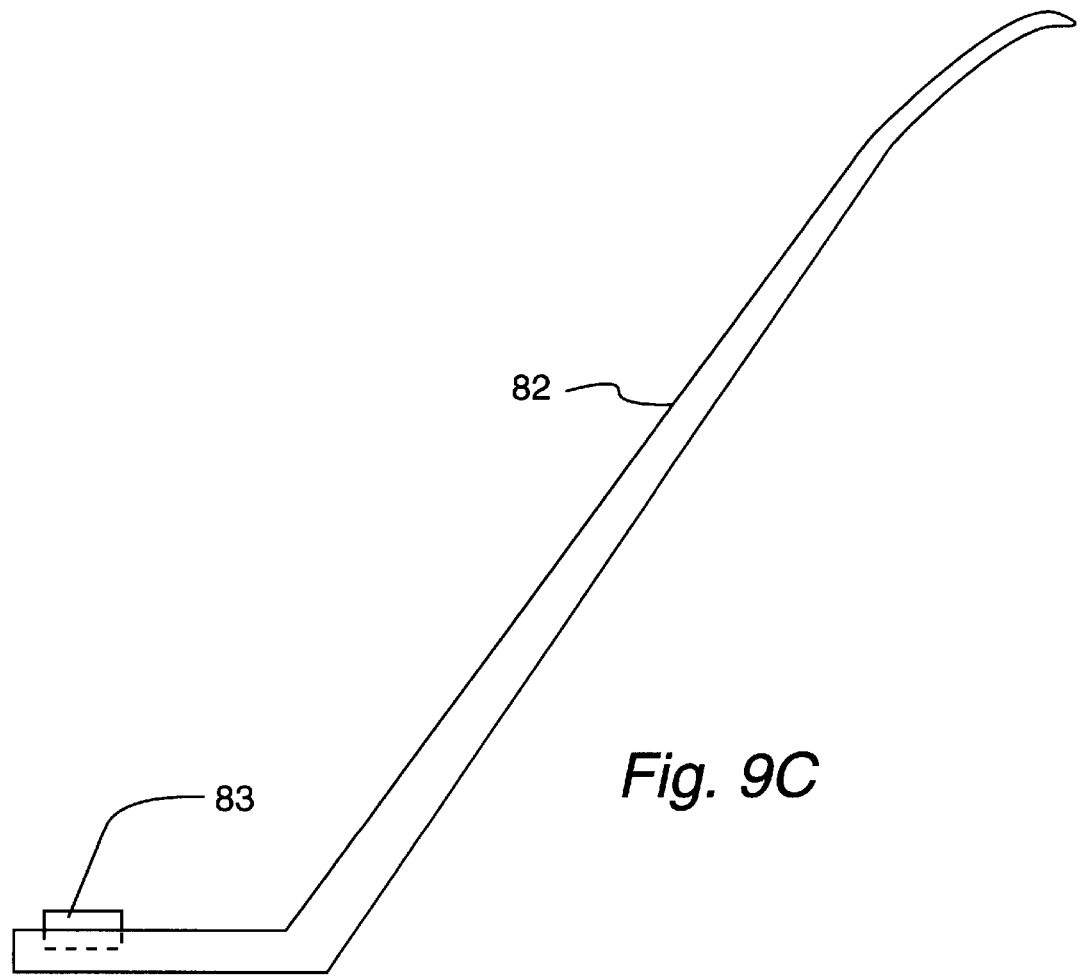
Fig. 9C

PANAMA CANAL INTERACTIVE MODEL AND GAME

FIELD OF THE INVENTION

As the Panama Canal enters its transition to Panamanian control, we are entering a new millennium. Yet this engineering marvel of the early 20th century is largely unknown to children today. The present invention seeks to familiarize children with the Panama Canal through an interactive model and a game related to it.

BACKGROUND OF THE INVENTION

The prior art does relate to water containing play toys that permit some interaction. Miller et al. U.S. Pat. No. D 186,778 shows a design for an oval shaped water trough on legs apparently for the use of playing with toy boats. Wolfe U.S. Pat. No. 3,302,949 describes a knock-down toy waterway for playground use. Small children can ride in small boats along this artificial waterway. Poehlman, U.S. Pat. No. 1,014,975 teaches a hydrostatic toy which models mountainous terrain bisected by a canal with locks permitting toy ships to be raised from the level of one ocean into the long central area and then lowered through the locks to the other ocean. This invention of Poehlman bears several of the features of the Panama Canal and permits children to add and withdraw water from the canal locks by raising or lowering hidden tanks connected to the locks via a flexible hose. Lock gates are also opened and closed by the user.

The prior art does not provide a Panama Canal model which clearly indicates the water levels in different parts of the model. Also lacking is a competitive aspect which transforms the model into a game.

SUMMARY OF THE INVENTION

In keeping with these objects and others which may become apparent, the present invention is an educational amusement device which displays a working model of the Panama Canal for educational and amusement purposes.

The model includes a base having a first water impermeable pan therein with transparent exterior walls for viewing in cross section the locks of the miniature Panama Canal. An imitation terrain structure includes three dimensional forms extending upward from a top edge of the water impermeable pan.

There is at least one further water impermeable pan, wherein the first pan and the further pan are respectively connected to one or more connecting conduit lock. Each lock has a mechanism to vary water depth between the first pan and at least one further pan. The mechanism includes one or more fluid volume regulating lock gates which are openable from a lowered closed position to a raised open position. Each connecting conduit lock is in fluid flow communication between one or more of the pans, which represent the Atlantic Ocean, the Pacific Ocean, and one or more lakes, such as Gatun Lake.

The base includes a bottom floor and a plurality of interconnected upwardly extending walls. One of the walls is a vertically extending transparent proximal wall which provides a visual viewing image of respective interiors of the pans and the connecting conduit locks.

The fluid volume regulating lock gates include a tank reservoir holding a predetermined amount of fluid therein, wherein the tank reservoir is movable vertically within a frame having a plurality of upright walls. The tank reservoir has a bottom wall engagable with a flexible guide control strip, which flexible guide control strip is movable within a guidance channel sleeve.

The flexible guide control strip has a handle at a distal end thereof for pushing or pulling the flexible guide control strip and for raising and lowering the tank reservoir, which is in fluid flow communication with at least one connecting conduit lock by means of a flexible hose. The flexible hose permits fluid flow between the tank reservoir and a connecting conduit lock.

In order to add intrigue to the demonstration, the educational amusement model further includes one or more weighted movable island members within the pans corresponding to a lake, such as Gatun Lake.

The model also includes at least one removable cover terrain portion extending over the pans and the connecting conduit lock, from the aforesaid vertically extending transparent proximal wall of the base. The imitation terrain structure is connected by elastomeric gasket connectors to the pans and the connecting conduit locks.

In order to interact with the model one or more user-players move one or more floatable model ships, which are floatable within the various pans and the connecting conduit locks. Each floatable model ship is a miniature boat hull, preferably and optionally having a first polarized magnet therein. The first polarized magnet is attractive to a second polarized magnet located in a distal tip end of a manually graspable wand. The wand has a handle at a proximal end thereof, and the wand is engageable with the floatable model ship to guide the ship forward and rearward.

For further intrigue and to make the ship prone to toppling over unless handled with skill, each floatable model ship includes a weight in a high part thereof for making said each floatable model ship top heavy.

Optionally, the floatable model ship may be movable by fan driven wind from a wind source such as a fan unit or a hand held wind gun, with a hollow housing and a motor operating a rotatable fan. The wind source is manually operable by a trigger, a rear air intake screen end and a front air emitting end, wherein the wind gun has a battery power supply wired in series, which operates a fan motor through a trigger-activated momentary switch. The fan motor rotates the fan to draw air through the rear screen air intake end and out the front air emitting end toward the floatable model ship.

To keep track of the user-player's progress in advancing from one pan representing on e ocean to the opposite pan representing the other ocean, a stop watch may be include for indicating a time duration of movement of each floatable model ship from one selected location in a first pan to another selected location in a further pan.

When used as a game, there are a plurality of floatable model ships, wherein one of the floatable model ships acts as a first user movable playing piece, movable from one location in the first pan through at least one connecting conduit lock to another location in one or more second pans. A second of the floatable model ships acts as a second user movable playing piece movable from one location in one of the pans, such as one at the opposite end of the model, wherein the ship goes in a reverse order through each connecting conduit lock to another location in the first pan. Also, the ships may race in a parallel direction.

For the game, a command module includes a plurality of hinged cover pieces, each enclosing user interfacable game instruction indicia therein. A user operable random command generator, such as a pair of dice or a rotatable spinner, is operated by the user at selected intervals during the game.

To provide physical obstacles which the floatable ships encounter and must steer around, the model includes preferably one or more weighted movable islands. The weighted movable island members may be positioned in a cluster of weighted movable island members attached to a submerged weighted base.

The submerged weighted base, which is attached to the model's base, anchors respective bearings housing a respective rotatable axle for each weighted movable island member. Each axle is responsive to an axle engageable motor within the submerged weighted base and the respective weighted movable island members are interconnected by a belt engageable with respective pulleys within the submerged weighted base.

Each weighted movable island member is therefore movable in respective orbits about each respective axle.

Each weighted movable island member includes a polarized magnet therein for attracting each magnet within each floatable model ship.

The aforementioned axle-engageable motor is powered by one or more batteries operating at a predetermined voltage below standard shock hazard levels. The axle operable motor is activated by a switch connected to a current limiting resistor wired in series with a light emitting diode indicator. Furthermore in an optional preferred embodiment, the axle engageable motor operates intermittently by a switch having a transistor intermittently signalling each axle responsive motor to operate.

OBJECTS OF THE INVENTION

It is an object of the present invention to provide an interactive model of the Panama Canal with a clear indication of the water levels in the different sections.

It is another object of the present invention to provide a small inexpensive water-containing model and game that is easy to set up, knock down, and clean.

It is also an object of the present invention to permit children to conveniently add or withdraw water from the locks and to open and close lock gates.

It is a further object of the present invention to add a competitive factor for a single player by incorporating an electronic timer and game rules.

It is yet another object of the present invention to create a game for two players based on random trials (dice or spinner) and written commands.

It is also an object of the present invention to exploit the attraction of magnets to guide model ships and to interact with obstacles.

It is another object of the present invention to use model ships that are intentionally top-heavy to challenge the user to guide and handle them carefully over the entire course without toppling.

It is an object of the present invention to use spinning islands to create a changing obstacle course for ships.

It is also another object of the present invention to use "wind guns" to maneuver the ships along their course.

BRIEF DESCRIPTION OF THE DRAWINGS

FIG. 2 is a side view cross section of the first embodiment.

FIG. 6 is a typical "command set".

FIG. 8 is a system circuit diagram.

FIG. 9A is a side view of the ship of a ship subsystem.

FIG. 9B is a stern view of the ship of a ship subsystem.

FIG. 9C is a side view of a magnetic guidance wand of a ship subsystem.

DETAILED DESCRIPTION OF THE INVENTION

The first embodiment of this invention is envisioned as a very small, inexpensive table-top model using a small quantity of water. This necessitates the use of very small ship models which could pose a choking hazard to toddlers. Therefore the model should be restricted to the use of children over this age, or alternatively, the scale could be enlarged to accommodate larger ship models.

Figure 1:
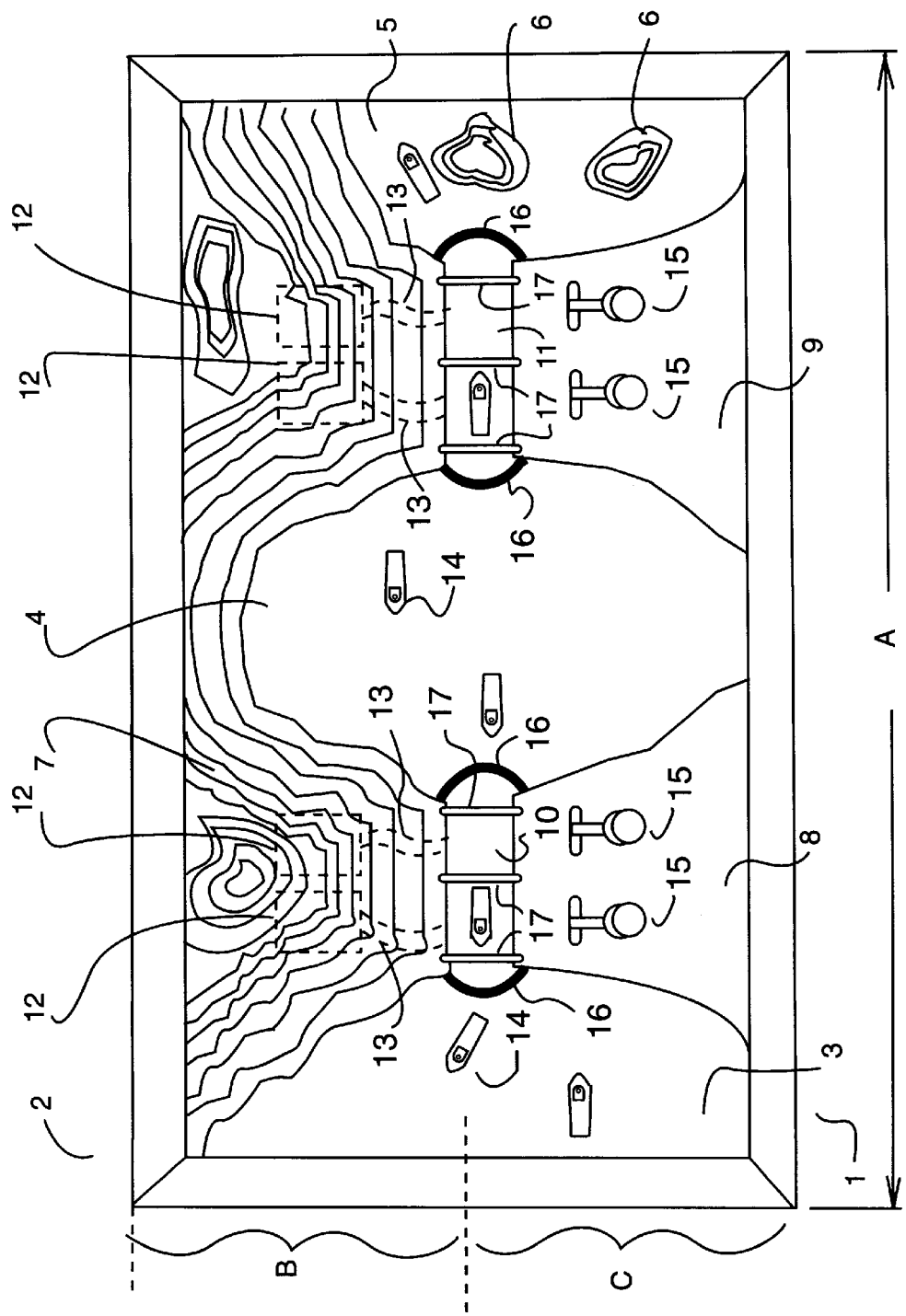
FIG. 1 is a top view of the first embodiment

FIG. 1 is a top view of the simplified model 1. Dimension A is preferably one to two feet (30 to 61 cm.). A plastic pan 2 with a purposely formed bottom has the capacity to hold all of the water used without spillage. The region B in the upper half of the figure is intended to be more detailed and representative of actual terrain and coastline; to this end, a contoured cover 7 is used. This can be a vacuum or pressure formed plastic cover representing two mountain peaks and painted accordingly; a more simplified version can be a plastic injection molding of uniform color. The lower region C in the figure is intended to be merely a schematic representation which can be used to illustrate the operation of locks and other hydrostatic principles. Simple low removable cover sections 8 and 9 are used to outline the bodies of water. Weighted plastic islands 6 can be moved at will. The model does not attempt to accurately represent the Panama Canal in either detail or scale. The Atlantic Ocean 3, a twolock section 10, Gatun Lake 4, a second two lock section 11, and the Pacific Ocean 5 are molded as transparent injection molded sections which snap together at joints 16 with waterproof elastomeric gaskets. These sections can be made of acrylic or polycarbonate material. FIG. 2 is a front elevation showing the sides of the locks and the bodies of water. The front side of pan 2 is not shown for clarity. The ships 14, at the small scale described, would be approximately ½" (1.4 cm.) long; they are only propelled by "child power" in this embodiment. The lock gates 17 are simply lifted out of their molded grooves to open; they have a sealing elastomeric gasket. The bottom 20 of pan 2 is contoured to support and locate the snap-together water containing elements. Since these are transparent, a view as shown in FIG. 2 is possible with the levels of all bodies of water visible as if in cross section. This is instructive especially in the operation of the locks. Pan 2 is vacuum or pressure formed of acrylic or polycarbonate or similar plastic resins. Each of the locks has a molded plastic tank 12 attached via a hose 13. These tanks are hidden from view by removable contoured cover 7. In a method not unlike that used by Poehlman U.S. Pat. No. 1,014,975, the tank 12 is raised or lowered to change the water level inside a lock. The objective is to match water levels on either side of lock gate 17 before opening the gate. A control 15 is pushed in or out to control the level of each tank 12.

Figure 4:
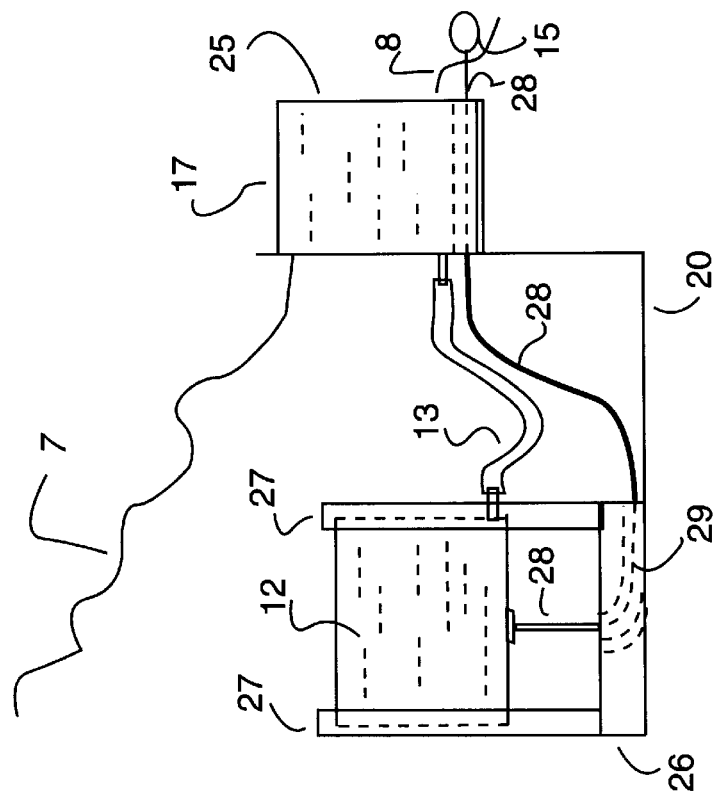
FIG. 4 is a side view of a lock, lock tank and operating mechanism.
Figure 3:
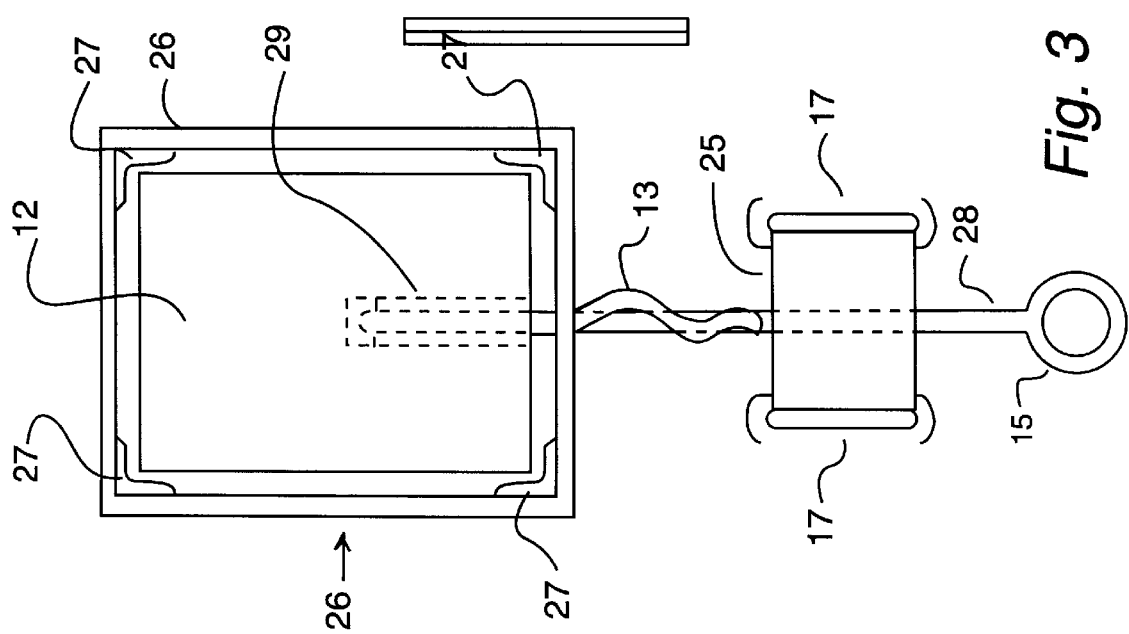
FIG. 3 is a top view of a lock, lock tank and operating mechanism.

FIGS. 3 and 4 detail the operation of the lock tanks 12. FIG. 3 is a top view while FIG. 4 is a side view elevation from the side "X" indicated in FIG. 3. Each tank 12 has a capacity somewhat larger than the capacity of a lock 25. Although no "net" water should flow in or out of a lock if the gates are opened with levels equalized, this condition might not be met in actual practice. This is the reason for the extra tank 12 capacity. Tank 12 is surrounded by a frame 26 with uprights 27; this permits the tank to move vertically. Frame 26 is bonded to pan bottom 20. Frame 26 has a guidance channel 29 which is used to guide control strip 28. Control strip 28 with loop 15 at its distal end is used to raise or lower tank 12 by a push-pull motion. It is of optimal stiffness. Strip 28 is a flat strip molded of PVC or similar material, and its end is attached to the bottom of tank 12. Flexible hose 13 permits water flow between the tank 12 and lock 25.

The child can interact with the ships, lock gates, water levels in the locks, the islands, and the various bodies of water. After the model is assembled, water from a simple pitcher is poured into the three major bodies of water to appropriate levels and into the four lock tanks 12. When play is over, the bodies of water can be unsnapped from each other; the water is simply drained into the pan 2 for later disposal. The parts are easy to clean.

Figure 5:
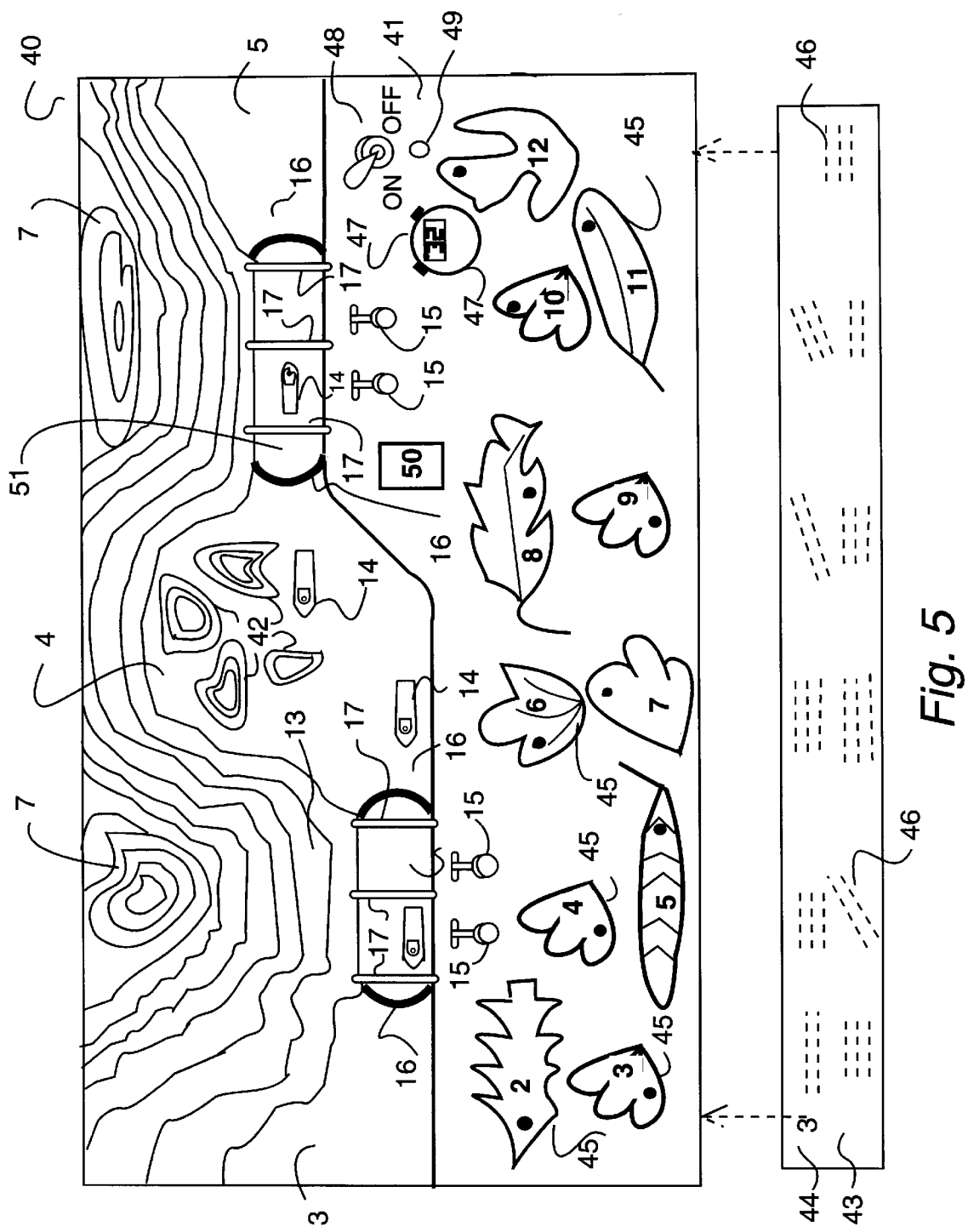
FIG. 5 is a top view of the preferred embodiment.

While retaining the lock mechanisms of the first embodiment along with the visible transparent side view of all bodies of water clearly showing water levels, apparatus is added to create a more interesting toy environment as well as gaiming aspects in the preferred embodiment. FIG. 5 is a top view which illustrates a modified waterway design with smaller regions devoted to the Atlantic Ocean 3 and Pacific Ocean 5 and a longer approach 51 representing the Gaillard Cut leading to the Miraflores Locks. Other feature changes as compared to the first embodiment include a single low flat front surface 41 decorated in a jungle motif and a set of four islands 42 in Gatun Lake 4. A battery pack 50 which powers a stop watch 47 through on/off switch 48 and light emitting diode (LED) indicator 49 summarize the changes. For the young child, a competition against the stop watch is a simple game which can be posed as "How many ships can you move from the Atlantic to the Pacific in 5 minutes?" with obvious variations. Other extensions such as "If you topple a ship, you must start over with another" are also easy to understand. For two older players, the game aspects are much richer with random elements added via two dice which are rolled or the use of a spinner. The overall objective is for one player to start the journey from Atlantic to Pacific while the other starts from the opposite direction. Note leaf shaped numbered areas 45 on panel 41. Each of these is a door which can be opened with a small knob (shown as a dot); the hinges are not shown since they would be molded in to the plastic surface 41. One of several rigid Command Sheets 43 (number 3 item 44 is illustrated) is shown before it is slid into a purpose designed slot beneath panel 41 in registration with leaf doors 45. Commands 46 are written on sheet 43 such that they can be read by opening leaf doors 45. The numbers 2–12 on leaf doors 45 correspond to the possible outcomes of rolling a pair of dice. The dice are rolled by the players at prescribed milestones in their journey and the commands are read according to the results of the throw and followed. A typical set of commands is shown in FIG. 6; many other possibilities are appropriate. Note that 2, 8 and 10 are the same command; repetitions are permitted. The particular number for a command determines its probability to some extent (note, for example, that 2 and 12 are the least probable). Different command sheets 43 have the same commands in different locations or actually different commands.

Figure 7:
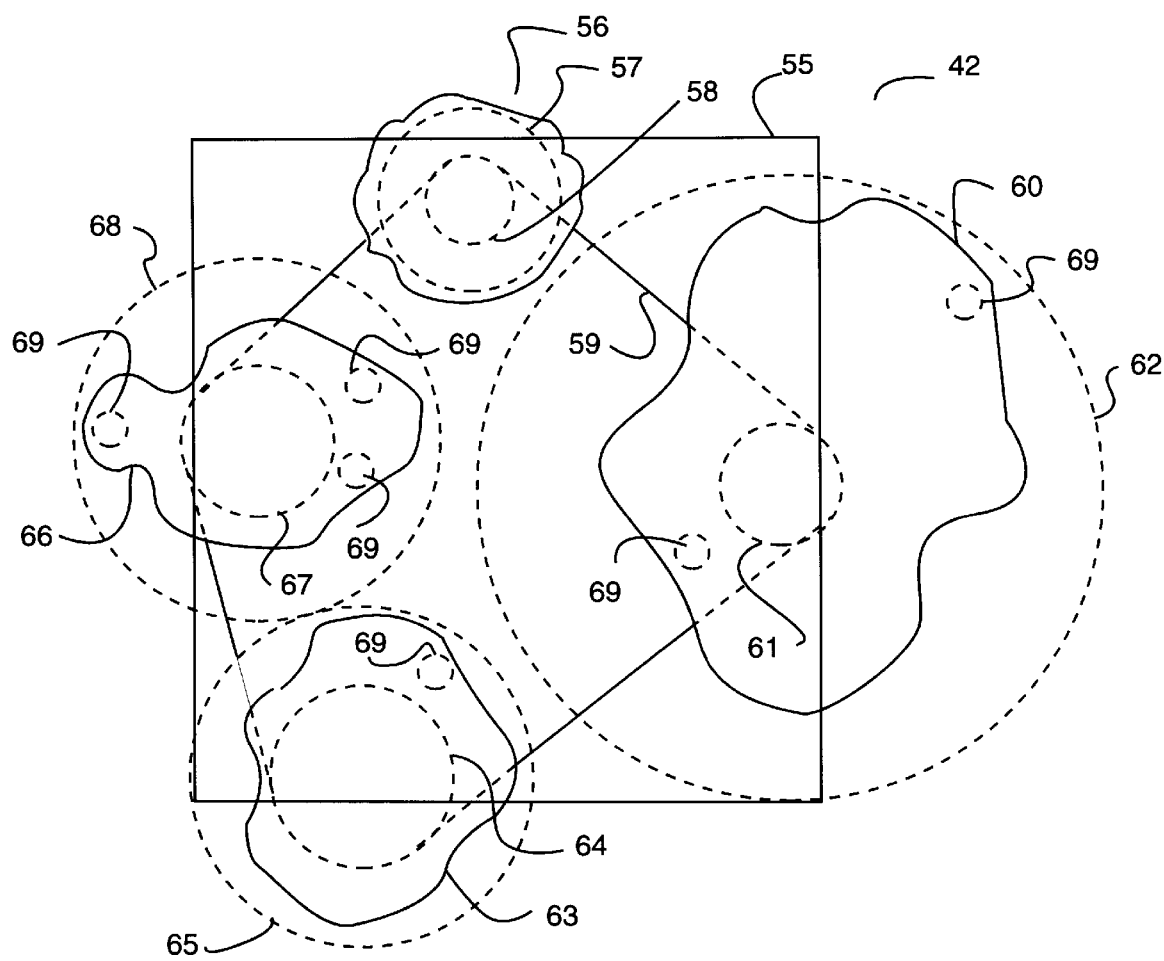
FIG. 7 is a top view of a spinning island group.
Figure 8A:
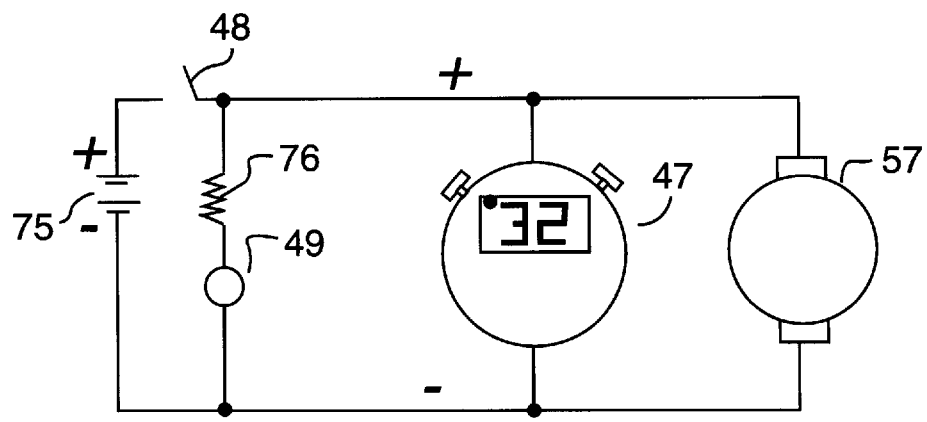
FIG. 8A is a system circuit diagram showing a continuous motor operation thereof.
Figure 8B:
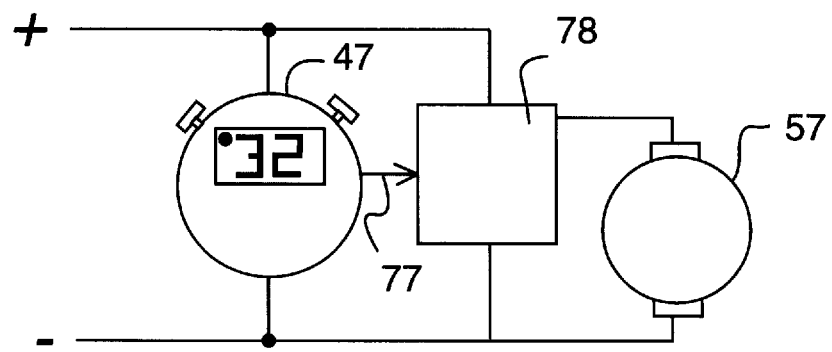
FIG. 8B is a system circuit diagram showing an intermittent motor operation thereof.

FIG. 7 is a top view of island cluster 42. Three of the islands rotate around their own axes under the influence of gear motor 57 which is enclosed in a waterproof housing 56 in the shape of a fourth stationery island 56. The island cluster 42 is a single entity attached to submerged weighted base 55 which anchors the bearings for the axles of the rotating islands as well as motor 57 in housing 56. The motor has a submerged output toothed pulley 58 which engages submerged timing belt 59 thereby rotating islands 60, 63 and 66 through their respective submerged attached toothed pulleys 61, 64, and 67. Since these island pulleys are of different sizes, they rotate the islands at different speeds continuously changing the navigable channels between them and relative to the shore in ever changing patterns for a cycle which then repeats. Note that the orbits defined by the extremities of the islands 62, 65 and 68 do not intersect each other or the stationary island 56 nor the shorelines. Small powerful rare earth magnets 69 are embedded in the edges of the rotating islands 60, 63 and 66 to interact with similar magnets in the ships to simulate "dangerous currents" which affect navigation. FIGS. 8A and 8B show wiring diagrams for the model and game. In FIG. 8A battery 75 in battery pack 50 of FIG. 5 is either a 3 volt system consisting of 2 "C" or "D" alakline cells or 4 such cells wired in series for a 6 volt system. Either voltage is well below the shock hazard level. On/off switch 48 is a single pole single throw toggle or rocker switch. 76 is a current limiting resistor in series with indicator LED 49. The stop watch 47 is a typical variety with alarms and the ability to start, stop, reset and set laps or elapsed intervals. Island rotating motor 57 runs continuously as long as switch 48 is on. Since the motor 57 is the largest load on the battery pack (100 to 250 milliamperes) it would be desirable to reduce its on-time without adversely impacting its function in order to extend battery life. FIG. 8B shows a modified detail which operates motor 57 in an intermittent fashion. Stop watch 47 is modified to derive a control pulse of a short duration (about 4 seconds) every 16 seconds or so as a control signal 77 to an electronic switch 78 which then drives gear motor 57. Electronic switch 78 is either a darlington transistor or metal oxide field effect transistor (MOSFET) as is well known in the art. Therefore, gearmotor 57 is driven with about a 25% duty cycle vastly extending battery life. By using a rather long pulse, low frequency approach to DC motor control, an inexpensive toy DC motor can be used with a compromise being achieved between desired duty cycle and the number of start/stop cycles which tend to limit motor life by accelerating bearing and brush wear. If the desired motor 57 output speed at pulley 58 for continuous operation were 5 RPM, the gear ratio is changed so that the output speed is increased to 20 RPM for the intermittent drive case. Then the average rotating speed of the islands would remain the same although they would be pulsed for 4 seconds at a time. The load for the motor is mainly frictional, so the reduced gear reduction for the intermittent case would not actually increase current draw since gear box friction is reduced.

The ship subsystem (FIGS. 9A, 9B and 9C) consists of several ships 14 of many different shapes. They would represent freighters, ferry boats, luxury liners, battleships, aircraft carriers, tankers, etc. However, each would have certain common features. In FIG. 9A, a small button rare earth magnet 81 is shown in the forward bottom section.

Also, a weight 80 is shown in a high part of the ship to intentionally make it top heavy. FIG. 9B shows the narrow beam of the ship from the stern which also makes the ship prone to toppling if handled roughly. This feature is meant as a challenge to the player. Points are taken away or other penalties are imposed if the ship topples. The magnets 81 in the ships are used to interact (adversely) with those magnets 69 in the edges of the rotating islands, however their main purpose is to permit them to be pulled and guided by a wand 82 with a magnet 83 as shown in FIG. 9C. The wand consists of a molded plastic shaft roughly in the shape of a hockey stick and about 6" (15 cm) long. The wand is held from the end with the tip submerged well below the waterline under the boat. The magnets are polarized to attract each other so that the wand can pull the ship with good training for eyehand coordination. The magnets of the wand 83 and ship 81 are not permitted to touch and attach; penalties are ascribed to such an event!

Figure 10:
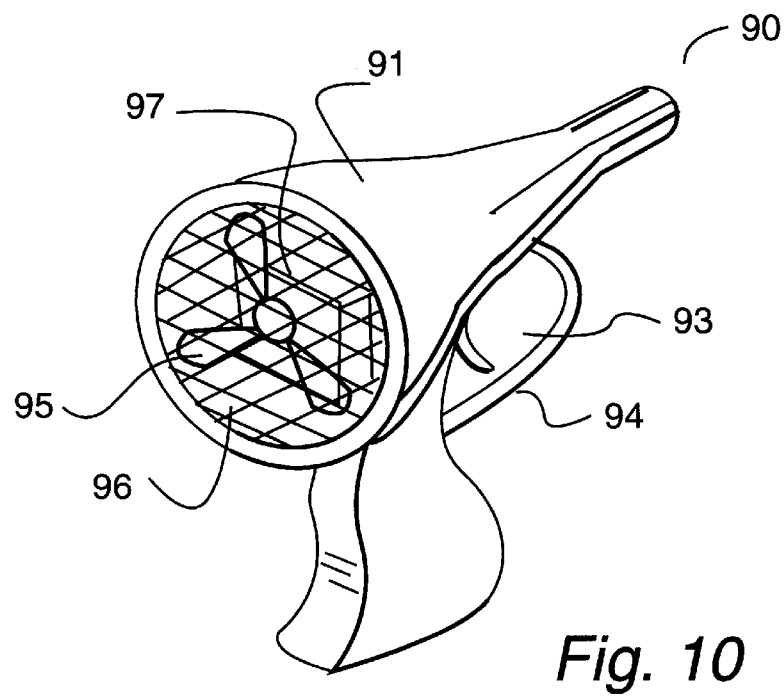
FIG. 10 is a perspective view of a wind gun.
Figure 11:
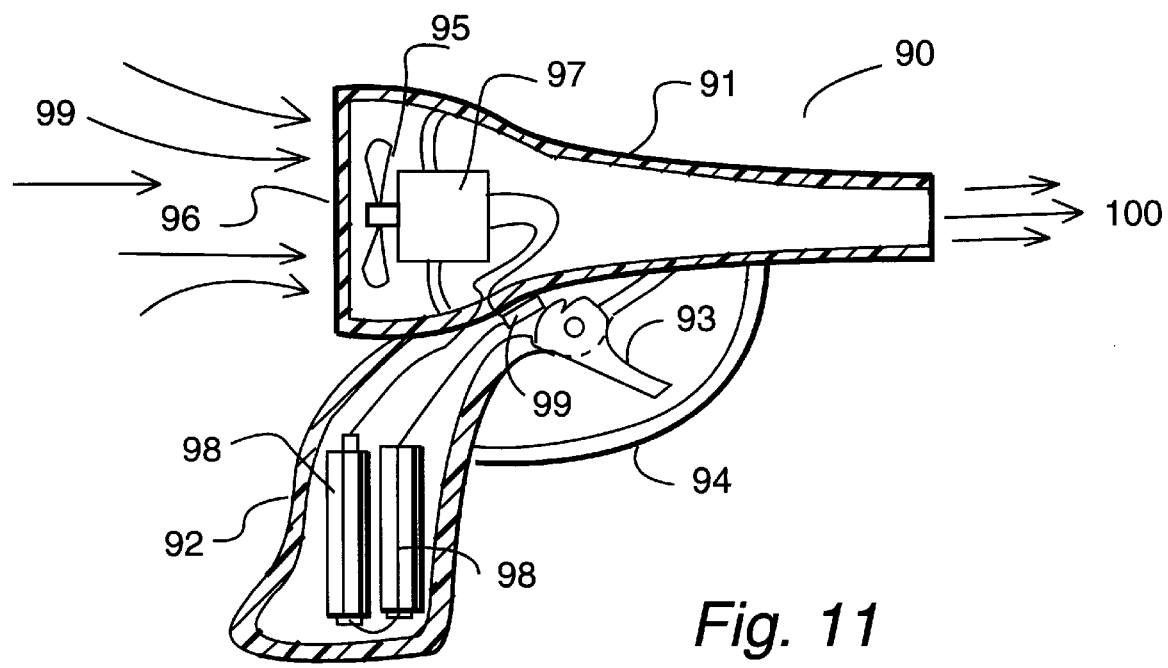
FIG. 11 is a side view of a cross section of the wind gun showing the wiring.

An alternate control method for navigating the ships 14 along the course is the wind gun 90 shown in FIGS. 10 and 11. This is used in lieu of the magnetic wand 82. The gun 90 has a hollow housing 91 with a motor 97 which operates a fan 95 which pulls air 99 from the back end through a protective screen 96 and discharges it in a narrow stream 100 at the front of gun 90. Trigger guard 94 helps anchor housing 91 to handle 92 which contains two size "AA" alkaline cells 98 wired in series to operate fan motor 97 through trigger 93 actuated momentary switch 99. This method of control gets quite interesting when two opponents must pass their respective ships in opposite directions! The weak air streams are used to impinge on a ship to provide motive power and directional control. Care must be taken not to topple the ship with a sideways impingement too high on the ship's profile.

I claim:

1. An educational amusement device comprising:

a base;

said base having a first water impermeable pan therein;

an imitation terrain structure including three dimensional forms extending upward from a top edge of said pan, at least one further water impermeable pan therein;

said first pan and said at least one further pan respectively connected to at least one connecting conduit lock having a means to vary water depth between said first pan and said at least one further pan, said means comprising at least one fluid volume regulating one lock gate openable from a lowered closed position to a raised open position;

said connecting conduit lock being in fluid flow communication between said first pan and said at least one further pan;

said base including a bottom floor and a plurality of interconnected upwardly extending walls, one of said walls being a vertically extending transparent proximal wall providing a visual viewing image of respective interiors of said first pan, said at least one further pan and said at least one connecting conduit lock;

said fluid volume regulating lock gate comprising a tank reservoir holding a predetermined amount of fluid therein, said tank reservoir movable vertically within a frame having a plurality of upright walls, said tank reservoir having a bottom wall engagable with a flexible guide control member, said flexible guide control member having a handle at a distal end thereof for pushing or pulling said flexible guide control member for raising and lowering said tank reservoir, said tank reservoir being in fluid flow communication with said at least one connecting conduit lock by means of a flexible hose, said flexible hose permitting fluid flow between said tank reservoir and said connecting conduit lock.

2. The educational amusement device as in claim 1, further comprising at least one weighted movable island member.

3. The educational amusement device as in claim 2 wherein said at least one weighted movable island member comprises a plurality of weighted movable island members.

4. The educational amusement device as in claim 3 wherein said plurality of weighted movable island members comprise a cluster of weighted movable island members attached to a submerged weighted base, which said base anchors respective bearings housing a respective rotatable axle for each said weighted movable island member, each said axle responsive to an axle engagable motor within said submerged weighted base, said respective weighted movable island members interconnected by a belt engagable with respective pulleys within said submerged weighted base, each said weighted movable island member movable in respective orbits about each said respective axle.

5. The educational amusement device as in claim 4 wherein each said weighted movable island member includes a polarized magnet therein attracting said magnet within said at least one floatable model ship.

6. The educational amusement device as in claim 4 wherein said axle engagable motor is powered by at least one battery at a predetermined voltage below standard shock hazard levels.

7. The educational amusement device as in claim 4 wherein said axle operable motor is activated by a switch connected to a current limiting resistor wired in series with a light emitting diode indicator.

8. The educational amusement device as in claim 7 wherein said axle engagable motor operates intermittently by a switch having a transistor intermittently signalling said axle responsive motor to operate.

9. The educational amusement device as in claim 1, further comprising at least one removable cover terrain portion extending over said first pan, said at least one further pan and said at least one connecting conduit lock, from said vertically extending transparent proximal wall of said base.

10. The educational amusement device as in claim 1, wherein said imitation terrain structure is connected by elastomeric gasket connectors to said first pan, said further pan and said connecting conduit lock.

11. The educational amusement device as in claim 1 further comprising at least one floatable model ship floatable within said first pan, said at least one further pan and said connecting conduit lock.

12. The educational amusement device as in claim 11, wherein said at least one floatable model ship comprises a miniature boat hull, said miniature boat hull having a first polarized magnet therein, said first polarized magnet being attractive to a second polarized magnet located in a distal tip end of a manually graspable wand, said wand having a handle at a proximal end thereof, said wand engageable with said at least one floatable model ship for guiding forward and rearward movement thereof.

13. The educational amusement device as in claim 11 wherein said at least one floatable model ship includes a weight in a high part thereof for making said at least one floatable model ship top heavy.

14. The educational amusement device as in claim 11 wherein said at least one floatable model ship is movable by fan driven wind from a wind gun, said wind gun having a hollow housing and a motor operating a rotatable fan.

15. The educational amusement device as in claim 14 wherein said wind gun further comprises a manually operable trigger, a rear air intake screen end and a front air emitting end, said wind gun having a battery power supply wired in series, said battery power supply operating a fan motor through a trigger-activated momentary switch, said fan motor rotating said fan for drawing air through said rear screen air intake end and out said front air emitting end toward said at least one floatable model ship.

16. The educational amusement device as in claim 1 further comprising a stop watch indicating a time duration of movement of said at least one floatable model ship from one selected location in said first pan to another selected loation in said at least one further pan.

17. The educational amusement device as in claim 16 wherein said educational amusement device comprises a game, wherein said at least one floatable model ship comprises a plurality of floatable model ships, one of said floatable model ships comprising a first user movable playing piece, movable from one location in said first pan through said connecting conduit lock to another location in said second pan, a second of said floatable model ships comprising a second user movable playing piece movable from one location in said further pan through said connecting conduit lock to another location in said first pan, a command module comprising a plurality of hinged cover piece, each said hinged cover pieces enclosing user interfacable game instruction indicia therein, and a user operable random command generator, wherein the user randomly operates said random command generator at selected intervals during said game.

18. The educational amusement device as in claim 17 wherein said user-operable random command generator is a pair of dice.

19. The educational amusement device as in claim 17 wherein said user-operable random command generator is a rotatable spinner.

* * * * *